J. C. WILLIAMSON.
Shovel Plow.
No. 19,886. Patented Apr. 6, 1858.
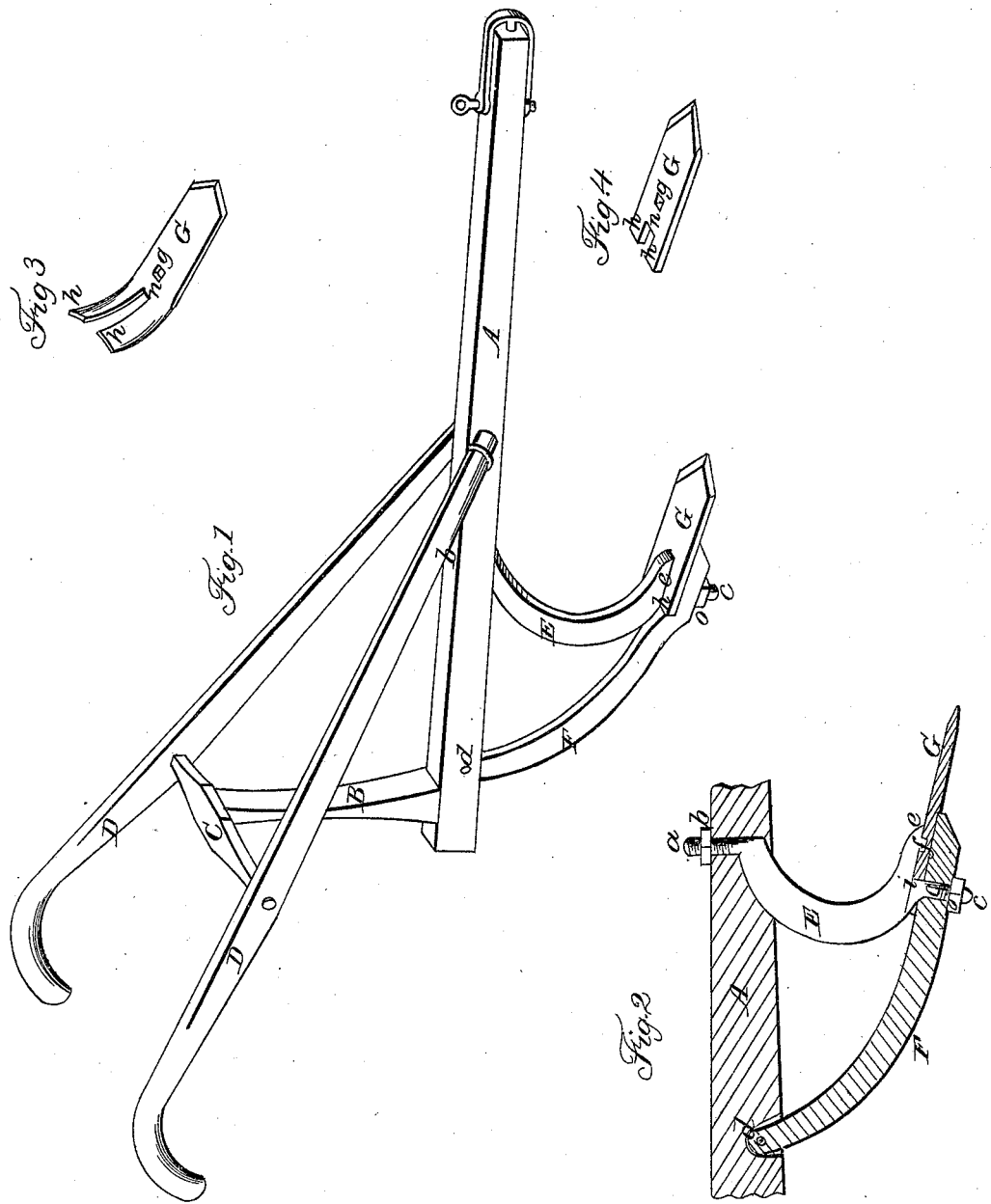

UNITED STATES PATENT OFFICE.

JOSHUA C. WILLIAMSON, OF WASHINGTON, GEORGIA.

IMPROVEMENT IN PLOWS.

Specification forming part of Letters Patent No. 19,886, dated April 6, 1858.

*To all whom it may concern:*

Be it known that I, JOSHUA C. WILLIAMSON, of Washington, in the county of Wilkes and State of Georgia, have invented certain new and useful Improvements in Plows; and I do hereby declare the following to be a full, clear, and exact description of the construction and operation of the same, reference being had to the accompanying drawings, making a part of this specification, in which—

Figure 1 represents a perspective view of the plow complete. Fig. 2 represents a vertical longitudinal section through the beam, brace, and shoe or cutting-blade, and showing the means of fastening the latter between the brace and plow-iron. Figs. 3 and 4 represent detached views of the shoes or cutters which I contemplate using.

Similar letters of reference, where they occur in the several figures, denote like parts of the plow in all of them.

My plow, exclusive of the stock, consists of but three pieces—viz., the plow-iron, brace and shoe, cutter or shovel; and my invention consists in the peculiar device employed for securing the cutter to the plow-iron and brace.

To enable others skilled in the art to make and use my invention, I will proceed to describe the same with reference to the drawings.

A represents the beam of the plow, which has an upright standard, B, at its rear end with a cross-brace, C, on its top, to which and to the beam the handles D D are secured, as shown in Fig. 1.

The plow-iron E is of a curved form, and has wrought upon its top part a screw-shank, *a*, which passes through the beam, and is secured thereto by a nut, *b*. On its lower end there is wrought a screw-shank, *c*, which passes through the front end of the brace F, said brace F being also curved backward and upward, and, passing into a mortise in the beam, is secured thereto by a pivot or bolt, *d*, upon which it may slightly turn, as seen in Fig. 2, to facilitate the removal and replacing of the shoe, cutter, or share G, as will be explained. The beam A, where the plow-iron E meets it, is cut away, as seen in Fig. 2, to allow said iron to enter and rest against the wood of the beam, to support it against the resistance of the earth or soil to be plowed or cultivated by the plow, and to prevent the strain from coming upon the screw-shank *a*. The lower part of the plow-iron E has a projection, *e*, upon it, on the under side of which projection there is a stud-pin, *f*, that passes through a hole, *g*, in the cutter G. A shoulder, *i*, is also formed on the plow-iron E where the projection *e* and screw-shank *c* meet, against which the shoulder *n* of the cutter G comes, while the parts *h h* each side of the slot in said cutter straddle the plow-iron and extend backward in contact with it, or backward and upward, as shown by the cutter at Fig. 3, as may be preferred.

To place the cutter in its proper position, as shown in the drawings Figs. 1, 2, the nut *o* on the screw-shank *c* is loosened, and the brace F is moved back and away from the plow-iron E far enough to slip the cutter G between them and to allow them to come up shoulder to shoulder and enter the stud-pin *f* in the hole *g*, made for it in said cutter. The nut *o* is then run up and the three pieces are firmly united together and to the beam.

To remove the cutter, either for sharpening or to substitute another, the operation is expeditious and simple, and the plow itself is extremely cheap and efficient. When a cutter such as shown in Fig. 4 is used and becomes worn it may be turned upside down, and thus become a self-sharpener. The only object in curving the parts *h h* of the cutter as in Fig. 3 is to throw the earth more from the furrow, when desirable.

Having thus fully described the nature and object of my invention, what I claim therein as new, and desire to secure by Letters Patent, is—

The combination of the plow-iron E, brace F, and cutter or share G, when formed and united together and to the beam in the manner and for the purpose set forth.

JOSHUA C. WILLIAMSON.

Witnesses:
  JAMES T. HACKNEY,
  G. G. NORMAN.